Jan. 28, 1936.  W. M. CHARMAN

HOT TOP AND LINING THEREFOR

Filed July 24, 1933

INVENTOR
WALTER M. CHARMAN

Kwis Hudson & Kent
ATTORNEYS

Patented Jan. 28, 1936

2,029,058

UNITED STATES PATENT OFFICE 2,029,058

HOT TOP AND LINING THEREFOR

Walter M. Charman, Cleveland Heights, Ohio

Application July 24, 1933, Serial No. 681,891

6 Claims. (Cl. 22—147)

This invention relates to improvements in hot tops and linings therefor, and is a continuation in part of my copending application Serial No. 490,224, filed October 21, 1930.

One of the objects of the invention is the provision of means for quickly and conveniently assembling lower lining members or wiper strips onto the body of a hot top.

Another object is the provision of a one-piece or ring lining member and/or wiper strip, with provision for attaching it to the hot top body, without fastenings, by a combined vertical and turning movement.

Another object of the invention is the provision of apparatus of the class indicated wherein a bayonet slot connection is employed for holding the ring in place.

Other objects and features of novelty will appear as I proceed with the description of those embodiments of the invention which, for the purposes of the present application, I have illustrated in the accompanying drawing, in which Figure 1 is a vertical central sectional view of a circular hot top embodying the invention.

Figure 1:
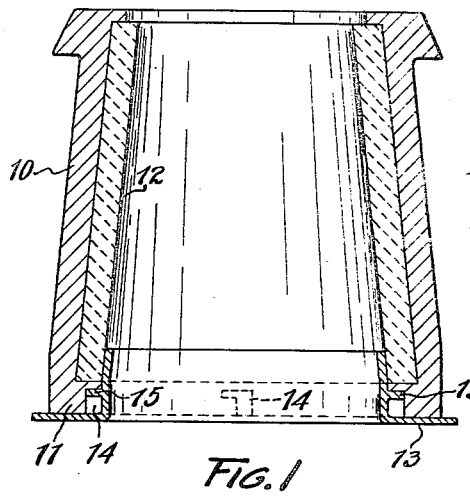
Figure 4:
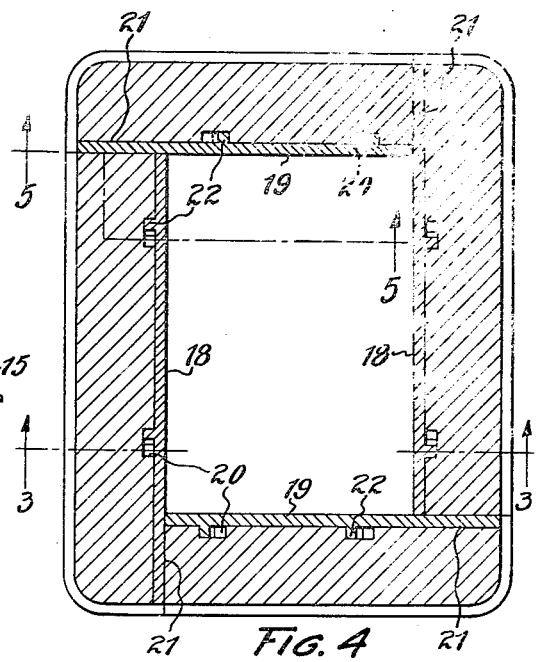
Fig. 4 is a horizontal sectional view taken substantially on the line 4—4 of Fig. 3.
Figure 2:
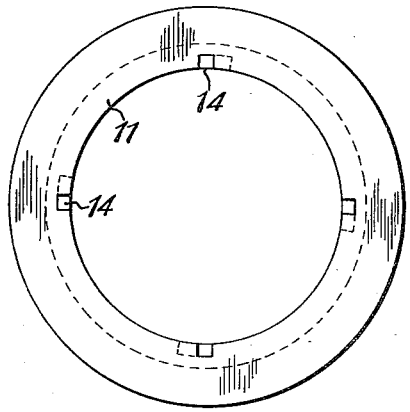
Fig. 2 is a bottom plan view of the casing of Fig. 1.
Figure 3:
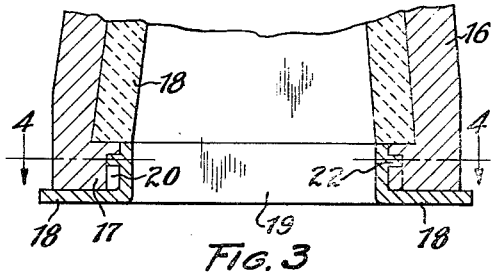
Fig. 3 is a fragmental vertical sectional view of a modified form of the invention applied to a rectangular hot top, the view being taken approximately on line 3—3 of Fig. 4.
Figure 5:
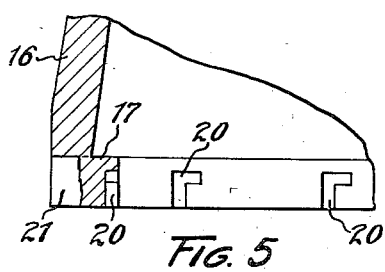
Fig. 5 is a fragmental vertical sectional view taken substantially on the line 5—5 of Fig. 4.
Figure 6:
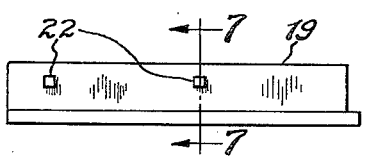
Fig. 6 is a side elevation of one of the lining elements used in the second form of the invention.
Figure 7:
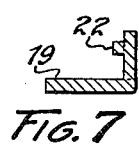
Fig. 7 is a cross sectional view taken substantially on the line 7—7 of Fig. 6.

Referring first to that form of the invention which is illustrated in Figs. 1 and 2, 10 represents a metal casing which is illustrated as round in cross section. The outer contour of the casing may be of any desired shape however to correspond with the inner contour of the mold with which the hot top is to be used. At the bottom of the casing there is an internal ledge 11 which, in this form of the invention, is circular. Upon this ledge is supported the upper permanent or semi-permanent lining course 12, which may be of any suitable material having good insulating qualities that is adapted to withstand with little deterioration the high heat of molten metal. The lining 12 may be formed in one or more pieces, but is preferably built up of a plurality of special molded bricks, the edges of which interengage in such manner as to lock the various bricks against movement inwardly. An example of a suitable arrangement is fully illustrated and described in Charman and Darlington Patent 1,804,206, granted May 5, 1931.

A lower lining ring 13 is employed to cover that surface of the ledge 11 which would otherwise be exposed to the molten metal, and to cover the lower extremity of the lining course 12 as well as the joint between that course and the ledge 11. The lower lining member also extends outwardly somewhat beyond the casing so as to wipe the mold as the hot top is lowered thereinto, thus preventing the metal from flowing up over the edge of the mold.

This lining member 13 is a ring made preferably in one piece. It may be a sheet metal stamping. It may also be a molded article, and in that event the material used may vary considerably. As one example, this material may be a paper-like material possessing heat-resisting qualities which prevent burning or else render the material slow-burning. In the latter event the material is not badly charred until after the metal directly adjacent to it has been cooled enough to form a shell around the molten metal.

The ring 13 comprises a horizontal portion which underlies the casing and extends outwardly therefrom far enough to wipe against the ingot mold, the outer edge of this horizontal portion being formed with a contour like that of the inner wall of the mold with which it is to be used. The outer edge, at least, is more or less resilient so that it may be deflected to such an extent as is necessary on account of the tapering of the mold walls and the distance to which the hot top is lowered into the mold. In addition to the horizontal portion the ring has an upstanding inner portion which is circular and covers the inner side of the ledge 11 and extends therebeyond a short distance so as to cover the joint between the ledge and the lining 12. The ledge 11 is provided with a series of downwardly opening bayonet slots 14.

Projections 15 are formed on the upstanding portion of the ring, these projections being of such size that they may be pushed into the vertical portions of the slots 14 and then slid sidewise into the horizontal portions of the slots when the ring and casing are turned relatively to each other around their common axis through a small angle. In this manner the ring is held against accidental displacement. When the ingot has been poured however, and the hot top is stripped therefrom, the ring 13 tends to stick to the ingot and the projections 15 readily fail, that is they break or bend sufficiently to pull out of the slots 14. In general they will be much weakened by the heat of the molten metal.

In Figs. 3 to 7 inclusive I have illustrated an application of the invention to a hot top having a rectangular inner contour. As in the first form of the invention, there is a metal casing 16 with an inturned lower ledge 17 and an upper lining course 18. In this modification the lower lining is formed in four pieces, one for each side of the hot top. As illustrated, these lining elements comprise two identical pieces 18 and two identical pieces 19. In the case of a square top all four pieces would be identical. The ledge 17 is provided in its inner surface on all four sides with inverted L-shape or bayonet slots 20, open toward the inside of the ledge, and the lower end of the vertical portion of each slot being open toward the bottom of the ledge. In each side of the ledge in line with the inner surface of an adjacent side I form an upwardly extending straight slot 21, which is of the same height as the ledge, and runs all the way through from the inside to the outside thereof. The lining elements 18 and 19 are each provided with inwardly extending projections 22.

When the lower lining is to be mounted upon the casing, the operator takes each element 18 or 19 singly and pushes the upstanding wall thereof upwardly, causing the projections 22 to enter the vertical portions of the slots 20, and causing an end portion of the upstanding wall to enter that slot 21 which is in alignment with the member then being inserted. When the projections 22 reach the top of the slots 20 the lining member is pushed endwise as far as it will go, the projections 22 being thereby forced into the horizontal portions of the slots 20. When all four members are in place the joints between them are preferably pointed up with a suitable heat resisting cement and the joint between the upper and lower course lining elements is also filled with the cement, after which the hot top is in condition for use. The outer edge of each lining member 18 and 19 may of course be given any contour necessary to make it conform with the contour of the mold with which it is to be used, and thereby to dam the flow of metal upwardly.

The projections 22 are similar to the projections 15, and they are adapted to fail when the hot top is stripped from the ingot, just as in the case of the projections 22.

In the foregoing description I have necessarily gone somewhat into detail in order to explain fully the particular embodiments of the invention herein illustrated, but I desire it to be understood that such detailed disclosures are not to be construed as amounting to limitations, except as they may be included in the appended claims.

Having thus described my invention, I claim:

1. In a hot top, a body member and a lower lining covering the lower end surface of the body member, said body member having inverted L-shaped slots and said lining having projections adapted to be moved into the slots from the bottom thereof and then moved into the horizontal portions thereof.

2. In a hot top, a body member and a lower lining member adapted to cover the lower end surface of the body member, the inner portion of said lining member extending upwardly for a short distance along the inner wall of the body member, said body member having inverted L-shaped slots and the inner upwardly extending portion of said lining member having projections adapted to be moved into the slots from the bottom thereof and then into the horizontal portions thereof.

3. In a hot top, a body member, a flexible lower lining covering the lower end surface of the body member and extending outwardly beyond the body member for engagement with the inner wall surface of the mold, said body member having inverted L-shaped slots and said lining having projections adapted to be moved into the slots from the bottom thereof and then into the horizontal portions thereof.

4. In a hot top, a casing, a flexible wiper strip extending outwardly from said casing, said wiper strip being provided with spaced projections, and said casing having slots therein comprising vertical portions adapted to receive said projections when the wiper strip is moved vertically into the slots and comprising horizontal portions connecting with the upper ends of said vertical portions adapted to receive said projections when the wiper strip is moved horizontally.

5. In a hot top, a body member having a series of slots in the lower end thereof, each of said slots having an open end and extending therefrom in a given direction angularly with respect to the axis of the hot top, and a one-piece lower lining member provided with a series of projections corresponding in number and position with the said slots, whereby the projections may be made to enter the slots after which the lower lining member may be revolved horizontally about the axis of the hot top to effect a lock between the body member and the lining member.

6. In a hot top, a body member having an inner wall circular in contour, a one-piece lower lining member and wiper strip comprising a portion extending beneath the end of the body member and extending outwardly therefrom and a portion extending upwardly along said circular inner wall, one of said members having bayonet slots and the other of said members having projections adapted to enter said slots, whereby the lower member may be mounted in the body member by an inward axial and then a rotational movement.

WALTER M. CHARMAN.